United States Patent Office 2,771,748
Patented Nov. 27, 1956

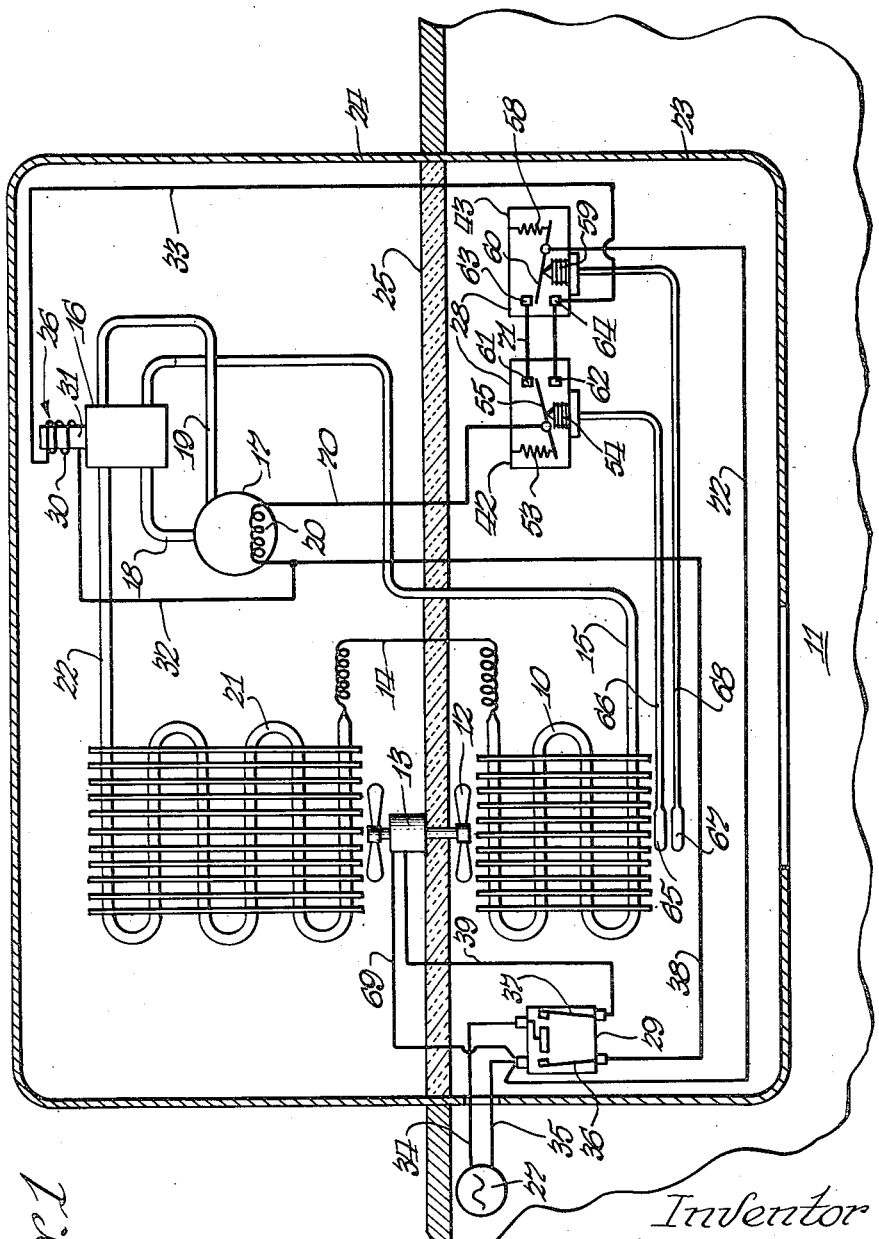

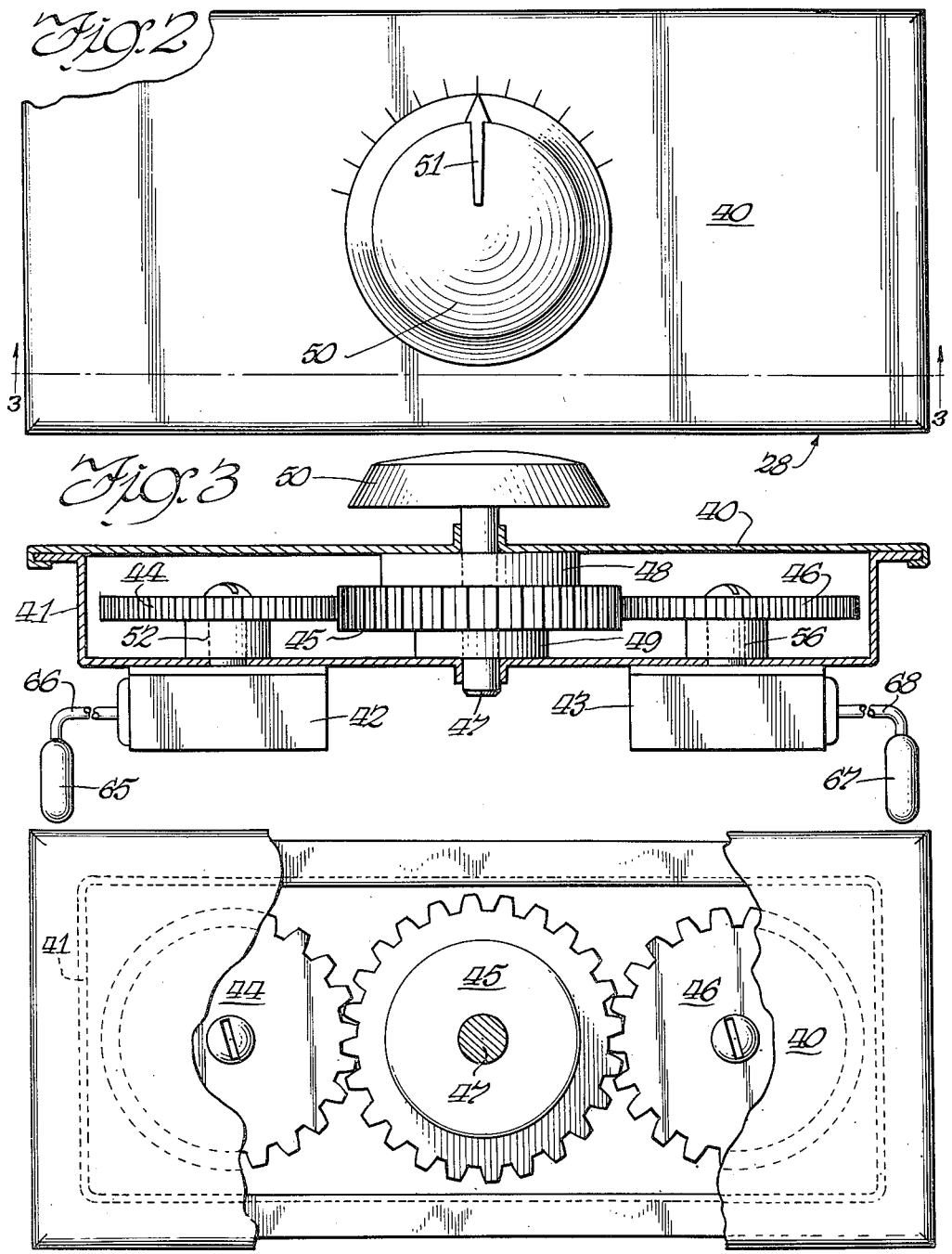

2,771,748

AIR CONDITIONING SYSTEMS FOR AUTOMATICALLY HEATING AND COOLING AN ENCLOSED AIR SPACE

John R. Prosek and John S. Palmer, Evansville, Ind., assignors, by mesne assignments, to Whirlpool-Seeger Corporation, a corporation of Delaware Application May 6, 1954, Serial No. 428,002

8 Claims. (Cl. 62—4)

The present invention relates to air conditioning systems and more particularly to an improved air conditioning system for heating and cooling an enclosed air space by automatically operating means.

Air conditioning systems which will automatically operate to cool the air in an enclosed space are well known in the art. Expansion type air conditioning systems having reversing valves which may be operated to reverse the functions of the conventional evaporator and condenser in a cooling unit are also well known in the art. When these functions are reversed the cooling unit will then operate as a heating unit to heat rather than cool the enclosed space. Generally, systems containing these reversing valves must be manually controlled, in other words, some switch or valve means are generally provided which must manually be operated to operate the reversing valve to cause a reversal of the functions of an evaporator and condenser in a cooling unit.

It is the object of this invention to provide an air conditioning system having a reversing valve for reversing the functions of the heat exchangers in the unit operated by automatic means.

It is a further object of this invention to provide a thermally responsive control system for an air conditioning unit having a refrigerant reversing valve which will automatically operate to cause the operation of the reversing valve.

It is a feature of this invention that a novel ganged arrangement is provided for a heating thermostat and a cooling thermostat.

Other objects and features of the present invention will be apparent upon a perusal of the following specification and drawings of which:

Figure 1 is a diagrammatic view of an air conditioning unit constructed according to the invention;

Figure 2 is a front plan view of the novel ganged arrangement for the heating thermostat and the cooling thermostat;

Figure 3 is a sectional view of the arrangement shown in Figure 2 and taken along the line 3—3; and Figure 4 is a front plan view of the arrangement shown in Figure 1 with the knob 50 and a portion of the plate 40 removed.

The present embodiment is the preferred embodiment but it is to be understood that changes can be made in the present embodiment by one skilled in the art without departing from the spirit and scope of this invention.

For a detailed description of the present embodiment reference is made to the drawings. A heat exchanger 10 is provided. The heat exchanger 10 may be of any type of air-to-liquid and gas heat exchanger well known in the art. The heat exchanger 10 is in a heat exchange relationship to the air within an enclosed space 11. A fan 12 which is operated by a motor 13 is mounted in cooperation with the heat exchanger 10 to circulate the air within the enclosed space 11 over the coils of the heat exchanger 10.

The heat exchanger 10 is fed liquid refrigerant through a metering tube 14 and is connected by tube 15 to a reversing valve 16. The reversing valve 16 may be of any type well known in the art having multiple ports and two positions of operation. An example of a reversing valve which can be used in this system may be seen in the patent application of John R. Prosek, entitled Four-Way Reversing Valve, filed January 19, 1952, Serial Number 267,244. A compressor 17 having an outlet line 18 and a suction line 19 is provided. The outlet line 18 and the suction line 19 are connected to the reversing valve 16. The compressor 17 may be of any type well known in the art and is operated by a rotatable shaft receiving power from the rotor of motor 20 which may be of the conventional open type or the hermetic type now in common usage. A second heat exchanger 21 which may be of any type well known in the art is also provided. This heat exchanger may be of the air-to-liquid type or the liquid-to-liquid type. Of whatever type the heat exchanger 21 be, it is necessary that the heat exchanger 21 be capable of extracting heat when any hot gaseous refrigerant is flowing therethrough and of transferring heat when any cold liquid and/or gaseous refrigerant is flowing therethrough. The heat exchanger 21 is connected to the reversing valve 16 by means of tube 22. Since it is intended that the air conditioning system of the present embodiment be of the direct expansion type, metering means 14 is provided. The metering means 14 should preferably be of the restrictor or capillary tube type as shown and is connected between the two heat exchangers 21 and 10. The entire air conditioning system as described is charged with a specific amount of a suitable refrigerant such as one of the Freons. The apparatus described is all contained within an inner housing 23 and an outer housing 24 which are separated internally by a thermally insulated dividing wall 25. The respective component parts are located substantially as shown.

The operation of the above described elements of the present invention will now be described in detail. Assuming that it is desired to cool the air of the enclosed space 11, the reversing valve 16 is operated to one position, and the fan motor 13 and the compressor motor 20 are caused to operate. The compressor motor 20 will operate the compressor 17 which will in turn deliver hot compressed refrigerant through the outlet tube 18. The warm compressed refrigerant will pass through the reversing valve 16 into the heat exchanger 21 through the length of tubing 22. The heat exchanger 21 will function as a condenser and the hot compressed refrigerant will be cooled and condensed therein. The cool liquid refrigerant will then pass from the heat exchanger 21, through the metering means 14 into the heat exchanger 10. The heat exchanger 10 will function as an evaporator, and as the fan 12 operates, the air within the enclosed space 11 will conduct heat to the liquid refrigerant within the heat exchanger 10 to cause an evaporation of the refrigerant therein. The evaporated refrigerant will be drawn from the heat exchanger 10 through the length of tubing 15, through the reversing valve 16, and through the suction line 19 into the compressor 17 to complete the cycle.

Assuming now that it is desired to heat the air in an enclosed space 11. The reversing valve 16 is operated to its other position, and the fan motor 13 and the compressor motor 20 are operated. Hot compressed refrigerant is delivered from the outlet line 18 of the compressor 17, through the reversing valve 16, through the length of tubing 15 into the heat exchanger 10. The heat exchanger 10 will now function as a condenser, and the air within the enclosed space 11, moved through the heat exchanger 10 by the fan 12, will be heated by the exchanger 10, and will in turn cool and condense the refrigerant within the heat exchanger 10. The cooled and condensed refrigerant within the heat exchanger 10 will pass through the metering tubing 14 into the heat exchanger 21. The heat exchanger 21 will now function as an evaporator, and will cause the liquid refrigerant metered therein to be heated to a gaseous state. The gaseous refrigerant within the heat exchanger 21 will be drawn therefrom through the length of tubing 22, through the reversing valve 16, through the suction line 19 into the compressor 17 to complete the cycle. It can thus be seen that by operation of the solenoid actuated valve 16 from one position to another, the functions of the heat exchangers 10 and 21 are selectively changed to cause either heating or cooling of the air within the enclosed space 11.

To cooperate with and to control the operation of the previously described elements of the present invention, an electrical solenoid 26, a power source 27, a pair of ganged thermostats 28, a selector switch 29, and the appropriate electrical conductors therefor are provided.

The solenoid 26 may be of any type well known in the art and comprises a solenoid coil 30 and a solenoid plunger 31. The solenoid plunger 31 is operatively connected to the reversing valve 16 and is so positioned and biased in relation to the solenoid coil 30, that when the solenoid coil 30 is deenergized, the solenoid plunger 31 will maintain the reversing valve 16 in the first of the previously described positions, in other words, in that position which resulted in the cooling of the air within the closed space 11. The solenoid plunger 31 is further positioned in cooperation with the solenoid coil 30 so that when the solenoid coil 30 is energized, the solenoid plunger 31 is drawn therein against the bias to cause an operation of the reversing valve 16 to the second of the previously described positions, in other words, in that position wherein the air within the enclosed space 11 is heated. The solenoid coil 30 is connected between the conductors 32 and 33.

The power source 27 may be of any type capable of providing power for operating the fan motor 13, the compressor motor 20, and the solenoid 26. One side of the power source 27 is connected to conductor 34, and the other side thereof is connected to conductor 35.

The switch 29 consists of two simple single-pole single-throw switches 36 and 37 which are cam actuated from a single knob (not shown). One contact of each of the switches 36 and 37 are connected to the conductor 34. The other contact of the switch 36 is connected to conductor 38, and the other contact of the switch 37 is connected to conductor 39.

For a detailed description of the ganged arrangement of thermostats 28, reference is particularly made to Figures 2 to 4 inclusive. The ganged arrangement of the thermostats 28 is preferably mounted in housing 23 which is within the enclosed space 11 so as to be responsive to the temperature of the air therein. The arrangement 28 comprises a rectangular case having a face plate 40 and a common gear housing 41 to which the thermostat bodies 42 and 43 are affixed. Three gears 44, 45 and 46 are rotatively mounted within the body 41. The gear 45 is fixedly mounted to a shaft 47 and is axially aligned by means of bushings 48 and 49. One end of the shaft 47 extends through an opening in the face plate 40 and a knob 50 is fixedly mounted thereon. The knob 50 has a pointer or reference mark 51 thereon, and a temperature scale or some other suitable calibration is mounted to the face plate 40 opposite the pointer 51. The gear 44 is fixedly mounted to a shaft 52 which extends into thermostat body 42, and the gear 44 is positioned so as to mesh with gear 45. Shaft 52 regulates the tension of the bias spring 53 which opposes the action of the thermostatic bellows 54 against switch arm 55. This cooling thermostat 42 may be of any type of adjustable thermostat well known in the art having two sets of contacts. Similarly, the gear 46 is fixedly mounted to a shaft 56 which extends into heating thermostat body 43 and the gear 46 is positioned so as to mesh with gear 45. Shaft 56 regulates the tension on bias spring 58 which opposes the action of the thermostatic bellows 59 against switch arm 60. The action of the thermostatic bellows 54 is governed by the temperature sensed by feeler bulb 65 through capillary tube 66. Similarly the action of thermostatic bellows 59 is governed by feeler bulb 67 through capillary tube 68. In the present embodiment the switch arms 55 and 60 are adjusted so that a 3 degree differential exists between their closing against their respective top contacts 61 and 63 and against their respective bottom contacts 62 and 64. In addition the ranges of the two thermostats 42 and 43 are pre-set so that a constant differential of 5 degrees is maintained between switch arms 55 and 60 as the knob 50 is rotated. Thus, for example, if switch arm 55 closes against contact 61 at 77° F., it will not close against contact 62 until the temperature sensed by bulb 65 drops to 74° F., and the switch arm 60 will remain on contact 63 as long as the temperature sensed by bulb 67 is not more than 5° F. below the point that switch arm 55 closes against contact 62.

With the foregoing arrangement the air conditioner may be employed to either heat or cool the enclosed space 11, shifting its operation automatically from heating to cooling or vice versa. By proper positioning of switch 29 the fan motor 13 alone may be operated. For cooling purposes the switch 29 is turned to the position which closes switches 36 and 37 thus connecting fan motor 13 across the source through conductors 39 and 69. Simultaneously when the temperature in the enclosed space 11 is above its cut-in point of the cooling thermostat 42, for example 77° F., a circuit for the compressor motor 20 is established through conductors 34, 38, 70, switch arm 55 closed against contact 61, conductor 71, switch arm 60 closed against contact 63, and conductors 72 and 35. When the temperature in enclosed space is cooled to 74° F., the spring 53 will overcome the action of the bellows 54 and cause arm 55 to close against contact 62. Since switch arm 60 remains against contact 63, the circuit to the compressor motor 20 is interrupted but the fan motor 13 continues to run. Thus if the temperature in the enclosed space 11 again rises to 77° F., the same cycle of operations will be repeated. If, however, the temperature in space 11 continues to fall, at 69° F., switch arm 60 will be closed against contact 64, since the spring 58 may then overcome the pressure of the thermostatic bellows 59. This establishes a circuit for the compressor motor 20 through contacts 62 and 64 and the jumper therebetween, and simultaneously energizes solenoid coil 30 through conductors 32 and 33. The solenoid plunger 31 operates the reversing valve 16 so that the functions of heat exchangers 10 and 21 are reversed, as previously described, and the space 11 will be heated until bulb 67 is warmed to 72° F., when the bellows 59 will overcome the bias of spring 58 to move switch arm 60 from contact 64 to contact 63 stopping the compressor motor 20 and de-energizing solenoid coil 30. Should the enclosed space 11 become cooled from an external source down to 69° the heating cycle would be repeated. However, should the temperature of space 11 continue to rise to 77° the cooling cycle previously described would automatically be repeated.

It should be understood that the temperatures stated were used for purposes of illustration only and that in the present embodiment the operating ranges of both thermostats 42 and 43 comprising the ganged arrangement 28 are simultaneously adjustable by means of knob 50.

The described operation of the instant invention assumed that the knob 50 was set at a temperature on the scale of 73° F., however, any other temperature could be used to provide a similar operation of the instant invention.

When it is desired to stop the operation of the instant invention, it is necessary that switch 29 be turned to an off position, thereby opening switches 36 and 37.

Having described the invention, what is considered new and desired to be protected by Letters Patent is:

1. In an air conditioning system for conditioning the air in an enclosed space and having a reversing valve operable to reverse the functions of the heat exchangers thereof, a solenoid mounted in cooperation with said reversing valve and operating responsive to the energization thereof for operating said reversing valve, a power source, a cooling thermostat, a heating thermostat, each of said thermostats being formed to be adjustable over certain temperature ranges, means for simultaneously adjusting each of said thermostats by the same amount over spaced apart cooperating ranges, circuit means connected in said air conditioning system to said solenoid, said power source and associated with said thermostats for causing the energization of said solenoid and the operation of said air conditioning system responsive to the operation of said heating thermostat at certain temperatures and for causing the operation of said air conditioning system responsive to the operation of said cooling thermostat at certain other temperatures.

2. In an air conditioning system for conditioning the air in an enclosed space and having a reversing valve operable to one position to cause said air conditioning system to cool said air in an enclosed space and operable to another position to cause said air conditioning system to heat said air in an enclosed space, a solenoid operating responsive to the energization thereof for operating said reversing valve to said other of said positions and operating responsive to the de-energization thereof for operating said reversing valve to said one of said positions, a cooling thermostat, a heating thermostat, each of said thermostats being formed to be adjustable over certain temperature ranges, gear means connected to said thermostats for adjusting the temperature ranges of said thermostats, said gear means formed to simultaneously adjust each of said thermostats by the same amount, circuit means operatively connecting said thermostats and said solenoid in said air conditioning system, said heating thermostat operating responsive to a requirement for heating of said air in an enclosed space to cause the energization of said solenoid and the operation of said air conditioning system, said cooling thermostat operating responsive to a requirement for cooling of said air in an enclosed space to cause the de-energization of said solenoid and the operation of said air conditioning system.

3. An air conditioning system for conditioning the air in an enclosed space comprising, a reversing valve mounted within said air conditioning system and operable to one position to cause said air conditioning system to cool said air in an enclosed space and operable to another position to cause said air conditioning system to heat said air in an enclosed space, a solenoid mounted in cooperation with said reversing valve and operating responsive to the energization thereof for operating said reversing valve to said other of said positions and operating responsive to the de-energization thereof for operating said reversing valve to said one of said positions, a cooling thermostat, a heating thermostat, each of said thermostats being formed to be adjustable over certain temperature ranges, gear means connected to said thermostats for adjusting the temperature ranges of said thermostats, said gear means formed to simultaneously adjust each of said thermostats by the same amount, circuit means operatively connecting said thermostats and said solenoid in said air conditioning system, said heating thermostat operating responsive to a requirement for heating of said air in an enclosed space to cause the energization of said solenoid and the operation of said air conditioning system, said cooling thermostat operating responsive to a requirement for cooling of said air in an enclosed space to cause the de-energization of said solenoid and the operation of said air conditioning system.

4. In an air conditioning system for heating or cooling, the combination of a pair of heat exchangers separated by an insulating barrier and connected by a capillary restrictor between said heat exchangers, a heating thermostat responsive to temperature change caused by heat from the first heat exchanger, a cooling thermostat responsive to heat from the same heat exchanger, a first spring biased switch lever connected to the motor actuated against its bias by said heating thermostat, a second spring biased switch arm actuated against its bias by said cooling thermostat, a motor compressor having its inlet and outlet connected to said heat exchangers through a reversing valve, a solenoid for actuating said reversing valve, a pair of cold responsive contacts connected together and to said solenoid and located to be engaged by the switch arms, said solenoid and motor being connected to line, a pair of heat responsive contacts connected together and located to be engaged by the switch arms, said second switch arm being connected to the opposite line, each thermostat being adjusted to a predetermined differential between its cut-in and cut-out, and the heating thermostat being adjusted to a larger differential between its cut-in and cut-out with respect to the differential of the cooling thermostat, whereby the first heat exchanger may be used for heating or cooling automatically responsive to said thermostats.

5. In an air conditioning system for heating or cooling, the combination of a pair of heat exchangers separated by an insulating barrier and connected by a capillary restrictor between said heat exchangers, a heating thermostat responsive to temperature change caused by heat from the first heat exchanger, a cooling thermostat responsive to heat from the same heat exchanger, a first spring biased switch lever connected to the motor actuated against its bias by said heating thermostat, a second spring biased switch arm actuated against its bias by said cooling thermostat, a motor compressor having its inlet and outlet connected to said heat exchangers through a reversing valve, a solenoid for actuating said reversing valve, a pair of cold responsive contacts connected together and to said solenoid and located to be engaged by the switch arms, said solenoid and motor being connected to line, a pair of heat responsive contacts connected together and located to be engaged by the switch arms, said second switch arm being connected to the opposite line, each thermostat being adjusted to a predetermined differential between its cut-in and cut-out, and the heating thermostat being adjusted to a larger differential between its cut-in and cut-out with respect to the differential of the cooling thermostat, whereby the first heat exchanger may be used for heating or cooling automatically responsive to said thermostats, and adjusting gearing connected to each other and to the springs of said spring bias switch levers to vary the bias simultaneously to increase or decrease the temperatures at which the functions of the heat exchangers are reversed.

6. In a control for an air conditioning system including a motor compressor, a pair of heat exchangers, a restrictor between the heat exchangers, and a solenoid actuated reversing valve connected between the compressor and the two heat exchangers in such manner as to reverse the direction of flow, the combination of a spring biased switch lever and a cooling thermostat acting thereon, a second spring biased switch lever and a heating thermostat acting thereon, a hot and a cold contact for each switch arm, the cold contacts being connected together, the switch arm of the cooling thermostat being connected to one side of the compressor, which is connected to one side of the line, and the solenoid having one terminal connected to said line the switch arm of the heating thermostat being connected to the other side of the line, and the cold contacts being both connected to the other side of the solenoid, both of said thermostats being located to be responsive to heat from the same heat exchanger, each thermostat having a predetermined small differential between its cut-in and cut-out, and the two thermostats having a respectively larger differential between their cut-in temperatures, whereby the control is adapted to effect heating or cooling by one of the heat exchangers automatically.

7. In a control for an air conditioning system including a motor compressor, a pair of heat exchangers, a restrictor between the heat exchangers, and a solenoid actuated reversing valve connected between the compressor and the two heat exchangers in such manner as to reverse the direction of flow, the combination of a spring biased switch lever and a cooling thermostat acting thereon, a second spring biased switch lever and a heating thermostat acting thereon, a hot and a cold contact for each switch arm, the cold contacts being connected together, the switch arm of the cooling thermostat being connected to one side of the compressor, which is connected to one side of the line, and the solenoid having one terminal connected to said line the switch arm of the heating thermostat being connected to the other side of the line, and the cold contacts being both connected to the other side of the solenoid, both of said thermostats being located to be responsive to heat from the same heat exchanger, each thermostat having a predetermined small differential between its cut-in and cut-out, and the two thermostats having a respectively larger differential between their cut-in temperatures, whereby the control is adapted to effect heating or cooling by one of the heat exchangers automatically, the said control also controlling the cut-in of an air circulating fan for each heat exchanger.

8. In an air conditioning system, a cooling thermostat, a heating thermostat, each of said thermostats comprising a thermostatically responsive bellows, a biased switch arm operatively connected with said bellows, and two contacts mounted to cooperate with said switch arm, two identical gears, each of said gears mounted to one of said thermostats to cooperate with said switch arm and said contacts thereof for adjusting the temperatures at which said bellows operates said switch arm to cause the contacts thereof to open and close, a third gear rotatively mounted in said air conditioning system and meshing with each of said identical gears for simultaneously changing by the same amount the temperatures at which said bellows operate said switch arms to cause said contacts to open and close.

References Cited in the file of this patent

UNITED STATES PATENTS

| | | |
|---|---|---|
| 2,155,371 | Anderegg et al. | Apr. 18, 1939 |
| 2,396,138 | Vernet | Mar. 5, 1946 |
| 2,480,937 | Kuhn | Sept. 6, 1949 |
| 2,490,983 | Smith | Dec. 13, 1949 |
| 2,654,227 | Muffly | Oct. 6, 1953 |
| 2,675,998 | Reynolds | Apr. 20, 1954 |

FOREIGN PATENTS

| | | |
|---|---|---|
| 241,941 | Switzerland | Aug. 16, 1946 |